United States Patent [19]

Seabourne et al.

[11] Patent Number: 4,972,042
[45] Date of Patent: Nov. 20, 1990

[54] BLOCKING ARRANGEMENT FOR SUPPRESSING FLUID TRANSMISSION IN CABLES

[75] Inventors: Judith L. Seabourne, Nr. Swindon; Alistair F. Hill, Cirencester; Paul A. Bradley, Swindon, all of England

[73] Assignee: Raychem Limited, London, England

[21] Appl. No.: 159,039

[22] PCT Filed: Jun. 12, 1987

[86] PCT No.: PCT/GB87/00410
§ 371 Date: Feb. 12, 1988
§ 102(e) Date: Feb. 12, 1988

[87] PCT Pub. No.: WO87/07754
PCT Pub. Date: Dec. 17, 1987

[30] Foreign Application Priority Data

Jun. 12, 1986 [GB] United Kingdom ............... 8614369

[51] Int. Cl.$^5$ ............................................. H02G 15/013
[52] U.S. Cl. .............................. 174/23 R; 174/77 R; 174/DIG. 8
[58] Field of Search ............... 174/23 R, 23 C, 77 R, 174/DIG. 8

[56] References Cited

U.S. PATENT DOCUMENTS

| | | | |
|---|---|---|---|
| 3,396,460 | 8/1968 | Wetmore | 29/859 |
| 4,018,733 | 4/1977 | Lopez et al. | 525/153 X |
| 4,095,044 | 6/1978 | Horsma et al. | 174/138 F |
| 4,179,319 | 12/1979 | Lofdahl | 174/77 R |
| 4,181,775 | 1/1980 | Corke | 428/348 |
| 4,195,106 | 3/1980 | Brusselmans | 428/34.9 |
| 4,654,473 | 3/1987 | Roux et al. | 174/77 R X |
| 4,693,767 | 9/1987 | Grzanna et al. | 174/77 R X |
| 4,696,841 | 9/1987 | Vidakovits | 174/DIG. 8 |
| 4,723,055 | 2/1988 | Bisker | 174/23 R X |

FOREIGN PATENT DOCUMENTS

A 61294 9/1982 European Pat. Off. .
A 133371 2/1985 European Pat. Off. .

Primary Examiner—Morris H. Nimmo
Attorney, Agent, or Firm—Herbert G. Burkard; Edith Rice

[57] ABSTRACT

An arrangement for forming a block in a cable against transmission of fluid along the cable comprises a generally flat blocking array (1) that is formed from a fusible polymeric sealant, e.g. a hot-melt adhesive or a thermosetting adhesive, which has a number of passage ways (2) extending from one end of the array to the other end for receiving wires (4) of the cable. The assembly includes a heat-shrinkable covering that can be positioned around the blocking array (1) in its flat configuration and recovered about the array by application of heat, and the sealant is capable of melting during recovery of the covering and being forced from a generally flat configuration to a generally cylindrical one by recovery of the covering. The invention also includes arrays per se which may be formed from hot-melt adhesives or thermosetting adhesives. The arrangement enables moisture blocks to be formed relatively rapidly and reliably in cables and harnesses having a large number of wires, and is particularly suitable for use in the manufacture of harnesses for automotive applications.

9 Claims, 2 Drawing Sheets

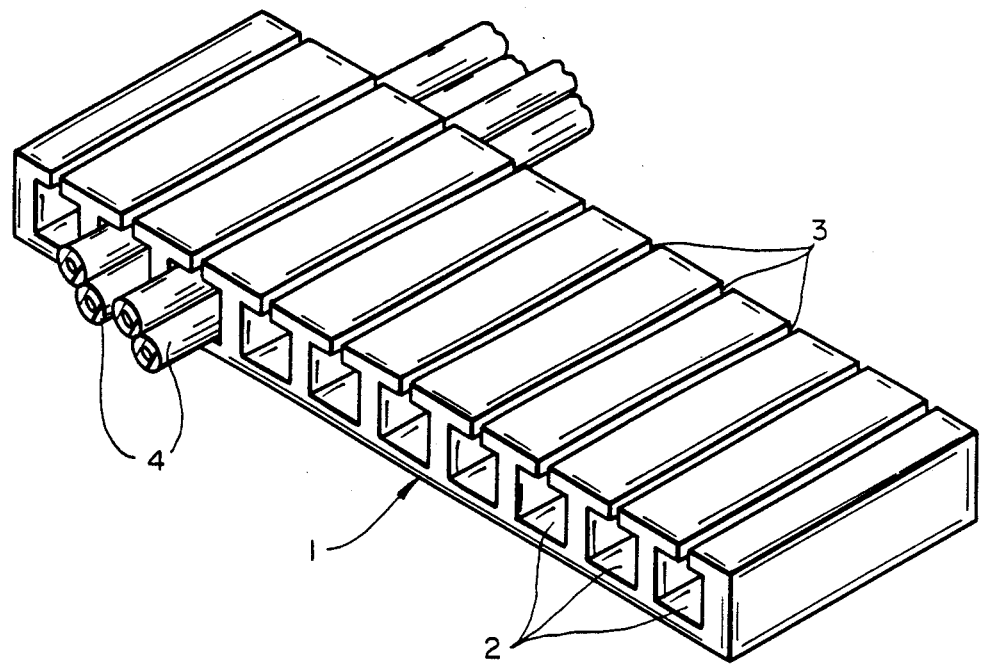
FIG_1
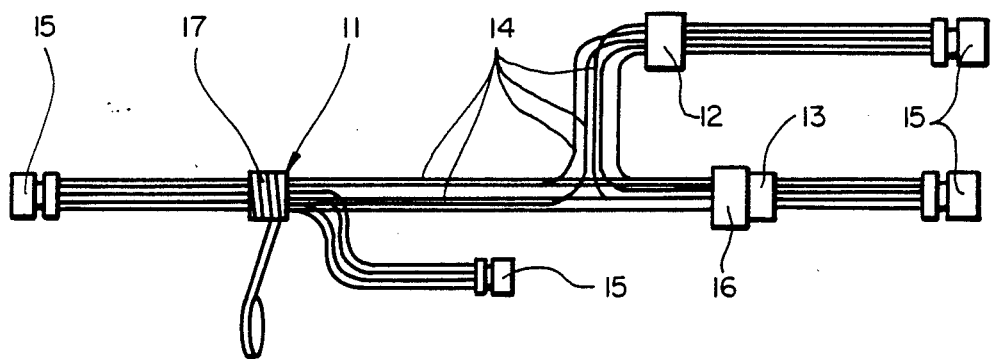
FIG_2

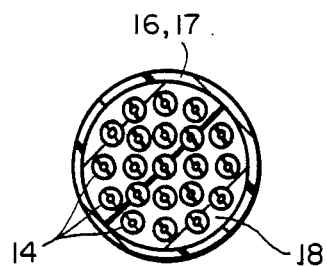
FIG_3
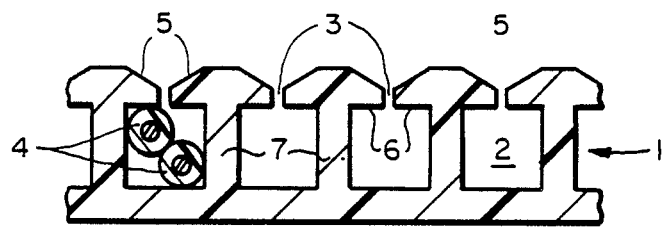
FIG_4
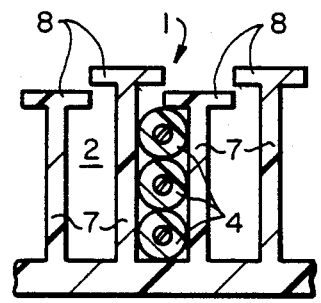
FIG_5

4,972,042

BLOCKING ARRANGEMENT FOR SUPPRESSING FLUID TRANSMISSION IN CABLES

BACKGROUND OF THE INVENTION

This invention relates to blocking cables, that is to say, to the provision of a quantity of sealant in a cable in order to prevent the transmission of fluids along the cable.

There are many circumstances in which it is necessary to provide a fluid block in a cable, for example to prevent transmission of water or water vapour along the cable or, in the case of pressurised cables, to limit the extent of depressurisation in the event of damage to the cable. Such cables include electrical cables and harnesses, optical fibre cables and hybrid cables and harnesses that contain both electrical wires and optical fibres (the term "wire" used herein including optical fibres and the term "cable" including harnesses).

A number of cable blocking systems have been proposed. For example a heat-shrinkable sleeve provided with a thick layer of hot-melt adhesive may be used to provide a block for cables having a small number of wires, for example up to 2 wires, but in the case of larger cables having three or more wires the wires are often pushed together during recovery of the sleeve and act as a barrier to prevent the adhesive flowing into the central interstice or interstices in the cable. In addition, in the case of larger cables it is not possible reliably to heat the centre of the cable without damaging the surface of the cable because of the relatively low heat conductivity of the insulating and water blocking materials. Although systems for forming water blocks in larger telecommunication cables exist, such systems are all very expensive and are time consuming to install taking often one half to three quarters of an hour for full installation. In certain instances, however, there is a need to provide a reliable fluid block in cables and harnesses of moderate size where the cost of the block and the time taken to form it are at a premium. One example of such an instance is in the manufacture of electrical harnesses for motor vehicles.

SUMMARY OF THE INVENTION

According to the present invention there is provided a generally flat blocking array for forming a block in a cable against transmission of fluid along the cable, the array having a plurality of passageways extending from one end thereof to the other end thereof for receiving wires and each passageway being capable of receiving one or more wires by insertion of the wires from the side of the passageway, the array being formed from a hot-melt or thermosetting adhesive that has a melting point of not more than 120° C.

A cable or harness may be blocked in a simple manner according to the invention by:

(a) positioning wires of the cable in passageways that extend along a substantially flat blocking array, the blocking array being formed from a fusible polymeric sealant;

(b) positioning a heat-shrinkable covering about the blocking array; and (c) heating the assembly so formed to recover the covering and melt the blocking array, recovery of the covering causing the configuration of the assembly to change from one that is substantially flat to one that is generally cylindrical.

Although it is possible to conduct the method according to the invention by inserting the wires into the open ends of the passageways in the blocking array, the passageways are preferably capable of receiving the wire or wires by insertion of the wire or wires from the side of the passageway.

The blocking array according to the invention enables the rapid formation of a fluid block in a cable or harness having three or more wires, especially one having more than 10 wires, for example at least 20 wires, and usually up to about 60 wires. Because the blocking array has a substantially flat configuration, no parts of the array or wires are remote from the surface of the arrangement before recovery of the heatshrinkable covering, with the result that the entire quantity of fusible sealant and all the wire insulation can be heated to the required degree to form an effective seal even though the sealant in the central region of the completed cable block can be a considerable distance from the surface of the cable. It is possible for the blocking array to be arranged so that each individual passageway receives only a single wire or so that it can receive more than one wire. It is preferred for the array to be designed so that each passageway can receive only a few wires, preferably no more than three wires, since if many more wires are inserted into the same passageway they may prevent the fused array material flowing into the central interstice formed by the wires. Some forms of array are designed so that each passageway can receive no more than two wires.

The blocking array may be sold separately from the covering or they may be sold together for example in the form of a kit, and so, according to another aspect, the invention provides an arrangement for forming a block in a cable against transmission of fluid along the cable, which comprises a generally flat blocking array that is formed from a fusible polymeric sealant, the array having a plurality of passageways extending from one end thereof to the other end thereof for receiving one or more wires of the cable and the assembly including a heat-shrinkable covering that can be positioned around the blocking array in its flat configuration and recovered about the array by application of heat, the sealant being capable of melting during recovery of the covering and being forced from a substantially flat configuration into a generally cylindrical configuration by recovery of the covering.

The blocking array according to the invention preferably has at least 5, more preferably at least 10 passageways and usually up to 30 passageways extending through it. Normally the blocking array will have a configuration such that all the passageways are arranged in a single flat array. This configuration has the advantage that it is possible for all the passageways to be capable of receiving one or more wires by insertion of the wires from the same side of the array. This enables the blocking array to be temporarily located on a wiring board in the manufacture of a cable harness, and then removed from the board only when all the wires have been inserted. For this reason it may be advantageous to provide the blocking array with a quantity of pressure sensitive or other adhesive on the side of the array opposite to the side from which the wires can be inserted. In other instances, however, and especially where the array has a relatively large number of passageways, the passageways may be arranged in a pair of flat arrays so that the wires are inserted from either or both sides of the array.

In addition to its use in forming a cable block, the blocking array may be used as a wire organiser, for example as described in British patent specification No. 2,038,110A, the disclosure of which is incorporated herein by reference. Thus, for example, in the manufacture of a harness either on a wiring board or in situ in a vehicle, the array may be slid or "combed" along the wires in order to organise them into the correct order. In order to improve the ability of the blocking array to be used as a wire organiser, two or more such arrays may be joined together with the passageways in each array being axially aligned to form an array of connected passageways. In this embodiment one or more arrays may be detached at different positions along the harness or cable.

The choice of fusible polymeric sealant that is used to form the blocking array will depend on a number of factors including the intended maximum operating temperature of the cable block. Preferably the sealant has a melting or softening point of at least 50° C. and especially at least 60° C., but usually not more than 120° C. and preferably not more than 100° C. The minimum acceptable softening point is usually determined by the maximum operating temperature of that part of the cable, while the maximum acceptable softening point is normally set by the type of insulation that the wires contain. The sealant is preferably a hot-melt adhesive or a thermosetting material such as epoxy resin/curing agent mixes may be used although other materials such as thermoplastic elastomers may be used. For example the blocking array may be formed as a co-extrusion of an epoxy (or other thermosetting resin) and a curing agent where the epoxy and curing agent are in the form of stripes. Articles formed in this manner are described in European patent specification No. 117,738, the disclosure of which is incorporated herein by reference. Examples of materials that may be used to form the blocking array include olefin homo- and copolymers, e.g. low density polyethylene, ethylene vinyl acetate or ethylene acrylate copolymers, ionomers, e.g. those sold under the trade mark "Surlyn" and polyamides, especially dimer diamine polyamides. Examples of preferred materials are given in U.S. Pat. Nos. 4,018,733 to Lopez et al and 4,181,775 to Corke, the disclosures of which are incorporated herein by reference.

The heat-shrinkable covering used in the present invention is preferably in the form of a sleeve and may be made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example<an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline point or, for amorphous materials the softening point, as the case may be, of the polymer, deforming the article and cooling the article whilst in the deformed state so that the deformed state of the article is heat-unstable, application of heat will cause the article to assume its original heat-stable shape.

Alternatively the sleeve may be formed from a fabric, preferably a woven fabric, that employs heatshrinkable fibres and preferably also a polymer matrix, for example as described in European patent specification No. 116,393, the disclosure of which is incorporated herein by reference.

Since the heat-shrinkable sleeve is required to force the blocking array from a flat configuration into a cylindrical configuration as well as exerting a radially compressive force on the fused array material, the sleeve should be able to accommodate a relatively large change in dimensions. Accordingly it is preferred to use a sleeve or other covering that has a relatively large recovery ratio, preferably at least 3:1 and especially at least 4:1, and which fits the array in its flat configuration reasonably snugly (without, of course, being so tight a fit that it is difficult to slide the sleeve over the array). In view of this, it may be appropriate in some instances for the heat-shrinkable covering to be in the form of a tape that can be wrapped around the blocking array and installed wires. In yet another arrangement the cover may be in the form of a slit sleeve that is provided with a closure device to enable the sleeve to be positioned around the array after installation of the wires and closed about the array and wires.

Any polymeric material which can be cross-linked and to which the property of dimensional recoverability may be imparted such as those disclosed in U.K. Specification No. 990,235 may be used to form the heat-shrinkable covering. Polymers which may be used as the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in U.K. Specification No. 1,010,064 and blends such as those disclosed in U.K. Specifications Nos. 1,284,082 and 1,294,665, and compositions such as those disclosed in our U.S. Pat. No. 4,275,180. The polymeric materials can be tailored to suit the intended use by the addition of fillers, e.g. semiconducting fillers or anti-tracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric composition may be cross-linked either by the incorporation of a chemical crosslinking agent or by exposure to high energy radiation. Examples of suitable crosslinking agents are free radical initiators such as peroxides for example, dicumyl peroxide, 2,5-bis-(t-butyl peroxy)-2,5-dimethylhexane, 2,5-bis(t-butyl-peroxy)-2,5-dimethylhexyne-3, $\alpha,\alpha$-bis-(t-butyl-peroxy)-di-iso propylbenzene. Other examples of appropriate cross-linking agents are disclosed in C. S. Sheppard & V. R. Kamath Polymer Engineering & Science 19 No. 9 597–606, 1979 ∫ The Selection and Use of Free Radical Initiators" the disclosure of which is incorporated herein by reference. In a typical chemically cross-linked composition there will be about 0.5 to 5 weight per cent of peroxide based on the weight of the polymeric composition. The cross-linking agent may be employed alone or in association with a co-curing agent such as a polyfunctional vinyl or allyl compound, e.g. triallyl cyanurate, triallyl isocyanurate or pentaerythritol tetramethacrylate.

Radiation cross-linking may be effected by exposure to high energy irradiation such as an electron beam or gamma rays. Radiation dosages in the range 2 to 80 Mrads, preferably 2 to 50 Mrads, e.g. 2 to 20 Mrads and particularly 4 to 15 Mrads are in general appropriate.

For the purpose of promoting cross-linking during irradiation preferably from 0.2 to 5 weight per cent of a prorad such as a poly-functional vinyl or allyl compound, for example, triallyl cyanurate, triallyl isocyanurate or pentaerythritol tetramethacrylate are incorporated into the composition prior to irradiation.

BRIEF DESCRIPTION OF THE DRAWINGS

FIG. 1 is an isometric view of a cable blocking array according to the invention;

FIG. 2 is a schematic view of a harness during its manufacture;

FIG. 3 is a section through a completed cable block that has been formed according to the invention;

FIG. 4 is a section through an alternative design of blocking array; and

FIG. 5 is a section through yet another design of blocking array.

DESCRIPTION OF PREFERRED EMBODIMENTS

Referring to FIG. 1 of the accompanying drawings, a cable blocking array comprises a generally flat body 1 having ten open-ended passageways 2 extending through it. Each passageway 2 has associated with it a slot 3 which enables an electrical wire to be inserted into the passageway simply by positioning the wire along the slot and pressing the wire into the passageway. It is possible for any number of wires to be inserted into each passageway, depending on the relative dimensions of the wires and passageways, although it is preferred for each passageway to contain about two such wires 4. As shown in FIG. 1, all the slots 3 are located on the same side of the array so that the opposite side of the array may be provided with a layer (not shown) of pressure sensitive adhesive, and release paper if necessary, for adhering the array onto a wiring board.

The blocking array may be made simply by extruding a hot-melt adhesive or other sealant with the appropriate cross-section. The extrusion is preferably conducted using a water-cooled die in tandem with the extrusion die in order to "set" the extrudate into the correct configuration. The slots 3 may be formed by extrusion or may be formed after extrusion using a knife blade.

FIG. 2 shows schematically a harness for an automotive vehicle in the course of production. Three blocking arrays 11, 12 and 13 have been located at predetermined positions along the harness and temporarily adhered to the harness wiring board by means of the pressure-sensitive adhesive. Wires 14 are then laid up in the general harness layout and can simply be pressed into the slots 3 of the array. The wires are then bound up and, if desired, heat-shrinkable tubing (not shown) is recovered onto the wires to form a harness jacket, followed by the connection of connectors 15 or other harness terminations.

Heat-shrinkable coverings, either in the form of a sleeve 16 that had previously been positioned on the harness, or in the form of a tape 17, is applied onto the blocking array and also onto the adjacent regions of the wires or cable jackets. The assembly is then heated, preferably by means of a hot-air gun, to form the completed cable block as shown in FIG. 3. In the resulting cable block, the wires 14 are completely encapsulated in fused and resolidified sealant 18, and the wires and sealant are enclosed in the heatshrinkable sleeve 16 or tape 17.

When applied to an existing cable, the arrangement can be installed with a heating time in the order of two minutes.

FIG. 4 shows an alternative form of blocking array according to the invention. In this array the side from which the wires 4 are inserted into the array contains a number of bevelled surfaces 5 adjacent to the slots 3 in order to facilitate correct alignment and insertion of the wires. If desired parts of the internal surface 6 of the passageways adjacent to the slots 3 can be built up so that the walls 7 between the passageways and individual parts of the bevelled upper surface have a generally "arrow-head" profile to retain the wires 4 in the passageways.

FIG. 5 is a section through part of another blocking array 1 in which the passageways 2 are each capable of receiving three wires 4. The passageways 2 are deep in relation to their width so that when the wires 4 are inserted into the passageway they all lie in the same plane with a separating wall 7 on either side of each wire. This arrangement enables the sealant from which the array is formed to flow around each of the wires 4 when the assembly is heated without a leak path being formed along the wires.

The walls are formed in each of two different lengths so that relatively long walls alternate with relatively short walls. This arrangement enables the enlarged tops 8 of the walls to retain the wires 4 within the passageways 2 without the slots for insertion of the wires into the passageways having to be so narrow that the tops 8 of adjacent walls 7 adhere to each other due to swelling of the sealant as it leaves the extrusion die during manufacture of the array.

What is claimed is:

1. An arrangement for forming a block in a cable against transmission of fluid along the cable, which comprises a generally flat blocking array that is formed from a fusible polymeric sealant, the array having a plurality of passageways extending from one end thereof to the other end thereof for reCeiVing one or more wires of the cable and the assembly including a heat-shrinkable covering that can be positioned around the blocking array in its flat configuration and recovered about the array by application of heat, the sealant being capable of melting during recovery of the covering and being forced from a substantially flat configuration into a generally cylindrical configuration by recovery of the covering.

2. An arrangement as claimed in claim 1, wherein each passageway of the array is capable of receiving one or more wires by insertion of the wires from the side of the passageway.

3. An arrangement as claimed in claim 2, wherein all the passageways are capable of receiving one or more wires by insertion of the wires from the same side of the array.

4. An arrangement as claimed in claim 3, wherein the blocking array is provided with a quantity of pressure sensitive adhesive on the side opposite the side from which the wires can be inserted.

5. An arrangement as claimed in claim 1 wherein the array has from 10 to 30 passageways.

6. An arrangement as claimed in claim 1, wherein the array is formed from a material selected from the group of an olefin homo- or copolymer and a polyamide.

7. An arrangement as claimed in claim 1 wherein the heat-shrinkable covering is in the form of a sleeve.

8. A method of forming a block in a cable against transmission of fluid along the cable, which comprises:

(a) positioning wires of a cable in passageways that extend along a substantially flat blocking array, the blocking array being formed from a fusible polymeric sealant;

(b) positioning a heat-shrinkable covering about the blocking array; and (c) heating the assembly so formed to recover the covering and melt the blocking array, recovery of the covering causing the configuration of the assembly to change from one that is substantially flat to one that is generally cylindrical.

9. A method as claimed in claim 8, wherein the cable contains from 20 to 60 wires and each passageway receives 2 wires.

* * * * *

UNITED STATES PATENT AND TRADEMARK OFFICE
CERTIFICATE OF CORRECTION

PATENT NO. : 4,972,042
DATED      : November 20, 1990
INVENTOR(S): Judith L. Seabourne, et al It is certified that error appears in the above-indentified patent and that said Letters Patent is hereby corrected as shown below:

Title page, item, [87] PCT Pub. No., replace "WO87/07754" by --WO87/07755--.

Column 3, line 54, after "example" delete [<].

Column 6, line 52, replace "reCeiVing" by --receiving--.

Signed and Sealed this

Twenty-second Day of March, 1994

Attest:

BRUCE LEHMAN

*Attesting Officer*  *Commissioner of Patents and Trademarks*